United States Patent [19]

McFarlane

[11] 4,360,330
[45] Nov. 23, 1982

[54] DEVICE FOR MOLDING FLASH CAPS FOR CATHETERS

[76] Inventor: Richard H. McFarlane, 2571 Kaneville Rd., Geneva, Ill. 60134

[21] Appl. No.: 282,414

[22] Filed: Jul. 13, 1981

[51] Int. Cl.³ .............................................. B29C 6/00
[52] U.S. Cl. .................................................. 425/122
[58] Field of Search ........................... 425/122, 129 R

[56] References Cited

U.S. PATENT DOCUMENTS

| | | | |
|---|---|---|---|
| 3,918,864 | 11/1975 | Braun | 425/122 X |
| 4,158,532 | 6/1979 | Kowalski | 425/122 X |
| 4,164,439 | 8/1979 | Coonrod | 425/122 X |

FOREIGN PATENT DOCUMENTS

| | | | |
|---|---|---|---|
| 400798 | 1/1970 | Australia | 425/122 |
| 1432972 | 7/1970 | Fed. Rep. of Germany | 425/122 |

Primary Examiner—J. Howard Flint, Jr.
Attorney, Agent, or Firm—John Cyril Malloy

[57] ABSTRACT

A plastics molding device is disclosed, which provides a plurality of cavities for the simultaneous molding of a plurality of flash caps, and including a punch die, operably supported relative to an outer end of each flash cap cavity, to punch a disc shaped member from a sheet of an appropriate synthetic material, and to position each disc in one of the cavities, in a proper position, to define integral outer end walls in the flash caps, when a suitable molten plastic material is injected into the respective cavities by way of appropriate runner grooves, in a generally conventional manner. Prior to injecting the plastic material, a core pin is advanced into each cavity in a simultaneous relation to the operation of the punch die, to clamp the respective disc members in outer ends of the cavities.

26 Claims, 5 Drawing Figures

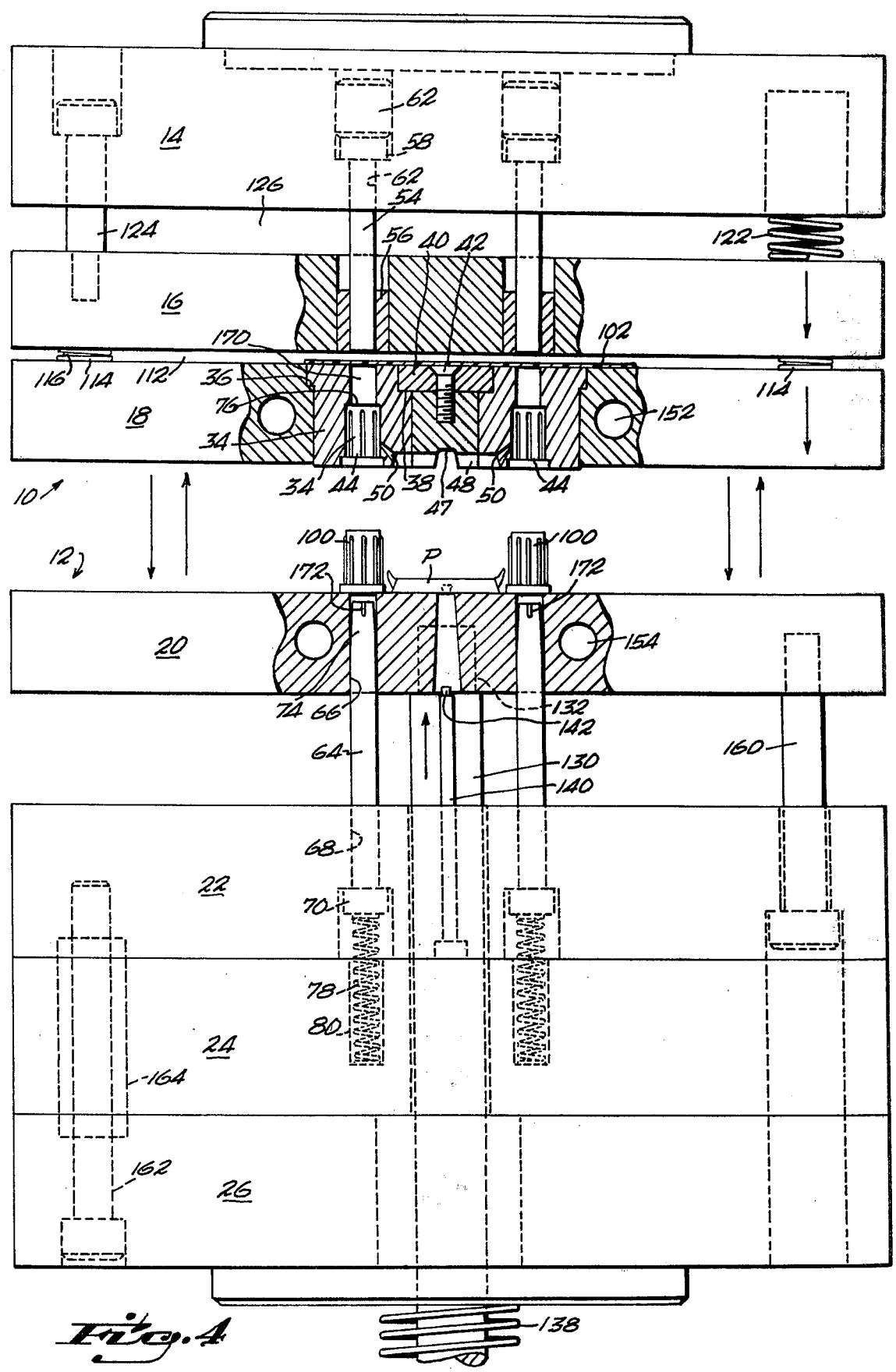

DEVICE FOR MOLDING FLASH CAPS FOR CATHETERS

BACKGROUND OF THE PRESENT INVENTION

The present invention pertains to a plastics molding device, and more particularly to a molding device of this nature which is adapted to form flash caps for catheters.

One of the principal objects of the present invention is to form or mold the flash caps with disc shaped rear end walls, which are formed of a suitable highly absorbant synthetic material, whereby the disc will immediately turn red when the catheter is filled with blood, when in use, while preventing any actual flowthrough. One suitable material is produced by the DuPont Corp. and is sold under the trademark "Tyvek," and is a nonwoven synthetic fabric material.

A further object of the invention is to provide a punch die means which simultaneously forms a plurality of discs from a sheet of the "Tyvek" material, and advances the discs into respective outer ends of the mold cavities, in synchronization with an opposed advancement of core pins into the cavities, from opposite ends thereof, to define a clamped positioning means for the discs in the outer ends of the respective cavities.

Another object of the invention is to provide appropriate runner grooves in the molding device to feed a molten plastic material into the cavities, in a conventional synchronized relation to the operation of a press, which carries the plastic molding device of the present invention.

Yet another object of the present invention is to direct the synthetic material such as "Tyvek" along a path which will utilize a maximum amount thereof.

BRIEF DESCRIPTION OF THE DRAWINGS:

FIG. 4 is a view similar to FIG. 3 with the various plate portions of the device in open positions for removal of the molded flash caps;

Figure 2:
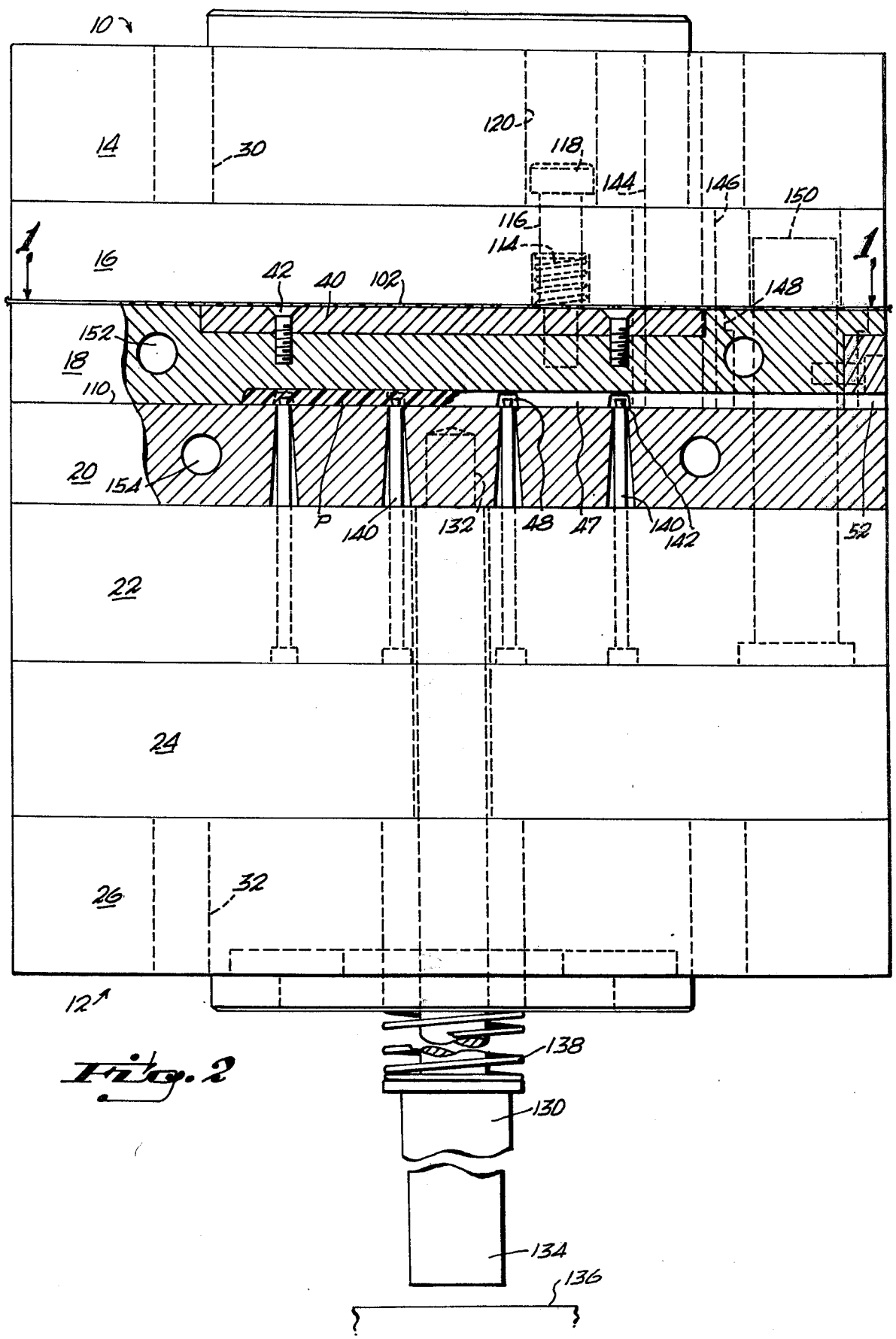
FIG. 2 is a plan view of the bottom side of the device as seen in FIG. 1, with a central longitudinal portion thereof being in cross section as seen along line 2—2 of FIG. 1.
Figure 3:
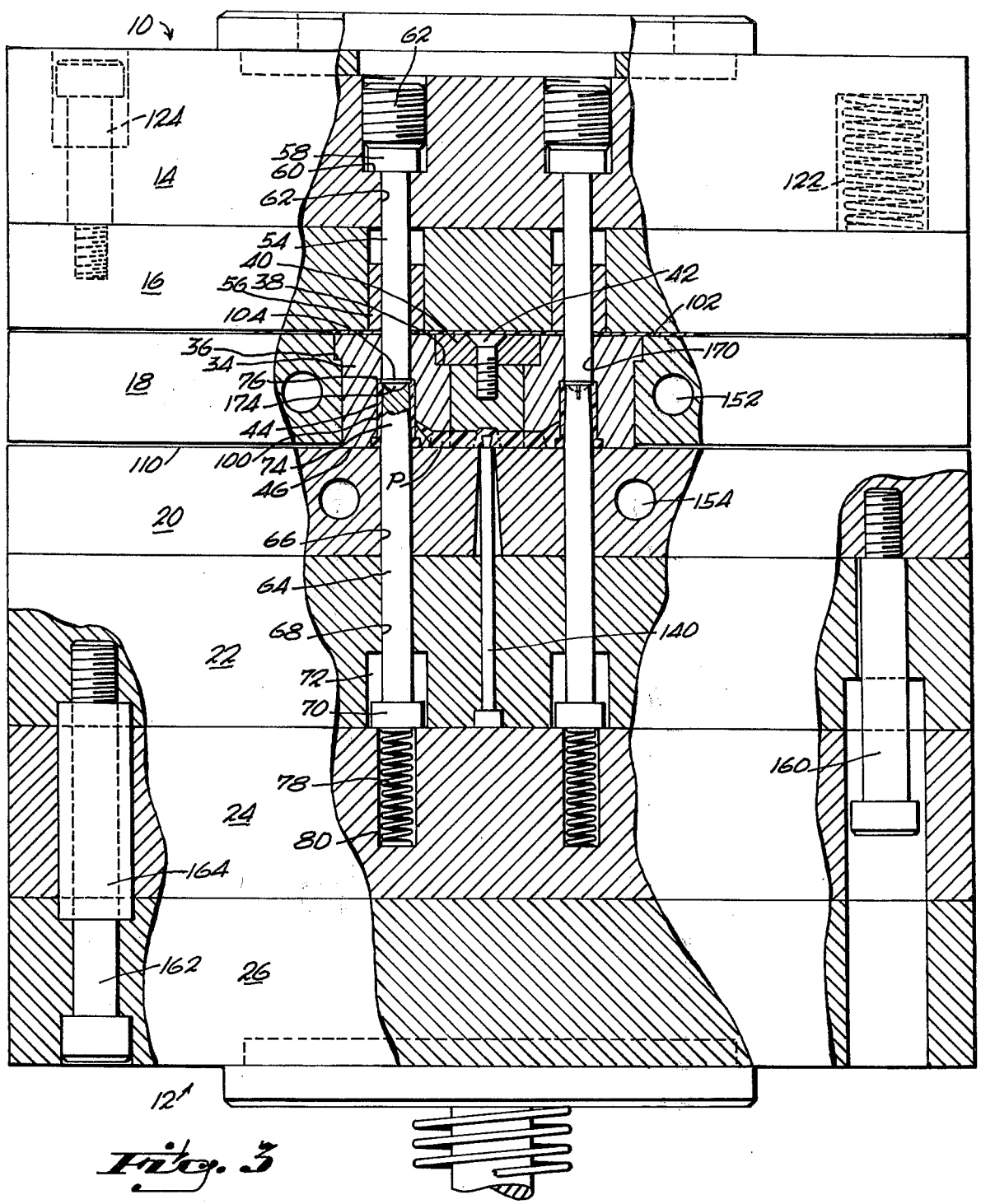
FIG. 3 is a plan view of the left side of the device as seen in FIG. 1, with a central vertical portion thereof being in cross section as seen along line 3—3 of FIG. 1. The various plate portions of the device are disposed in closed positions for the molding operation.

DESCRIPTION OF A PREFERRED EMBODIMENT:

With reference to the drawings, and particularly to FIGS. 2, 3 and 4, the flash cap molding device of the present invention includes a main top portion, indicated generally at 10, and a main bottom portion, indicated generally at 12. The top portion 10 is comprised of three, generally horizontal plates 14, 16 and 18, and the bottom portion 12 is comprised of four, generally horizontal plates 20, 22, 24 and 26.

In use, the main top portion 10 is secured to the bottom face of the top jaw of a press or the like (not shown), and the bottom portion 12 is secured to the top face of the bottom jaw thereof (not shown). For attachement purposes, the top plate 14 and the bottom plate 26 of respective portions 10 and 12 are provided with pluralities of attachment holes such as 30 and 32, FIGS. 1 and 2. The press is not illustrated as it is conventional in the plastics molding art to utilize a press or the like to carry mold portions to accomplish the opening and closing of two mold portions.

With reference to FIGS. 2 and 3, the top and bottom portions 10 and 12 are illustrated in a closed relation to accomplish the plastics molding operation. The bottom plate 18 of top portion 10 carries a plurality of molding members 34, such as eight in parallel rows of four each in the preferred form, FIG. 1. Each member 34 includes a semiannular shoulder 36 for seated engagement in companionate shoulders in plate 18, and aligned upwardly facing inner confronting shoulder portions 38 for engagement by a common central locking plate 40, secured to plate 18 by screws 42. Like cavities 44, opening upwardly from bottom faces 46 of members 34, are defined in each of said members 34. Cavities 44 define the outer peripheral configurations of the flash caps to be molded therein.

Figure 1:
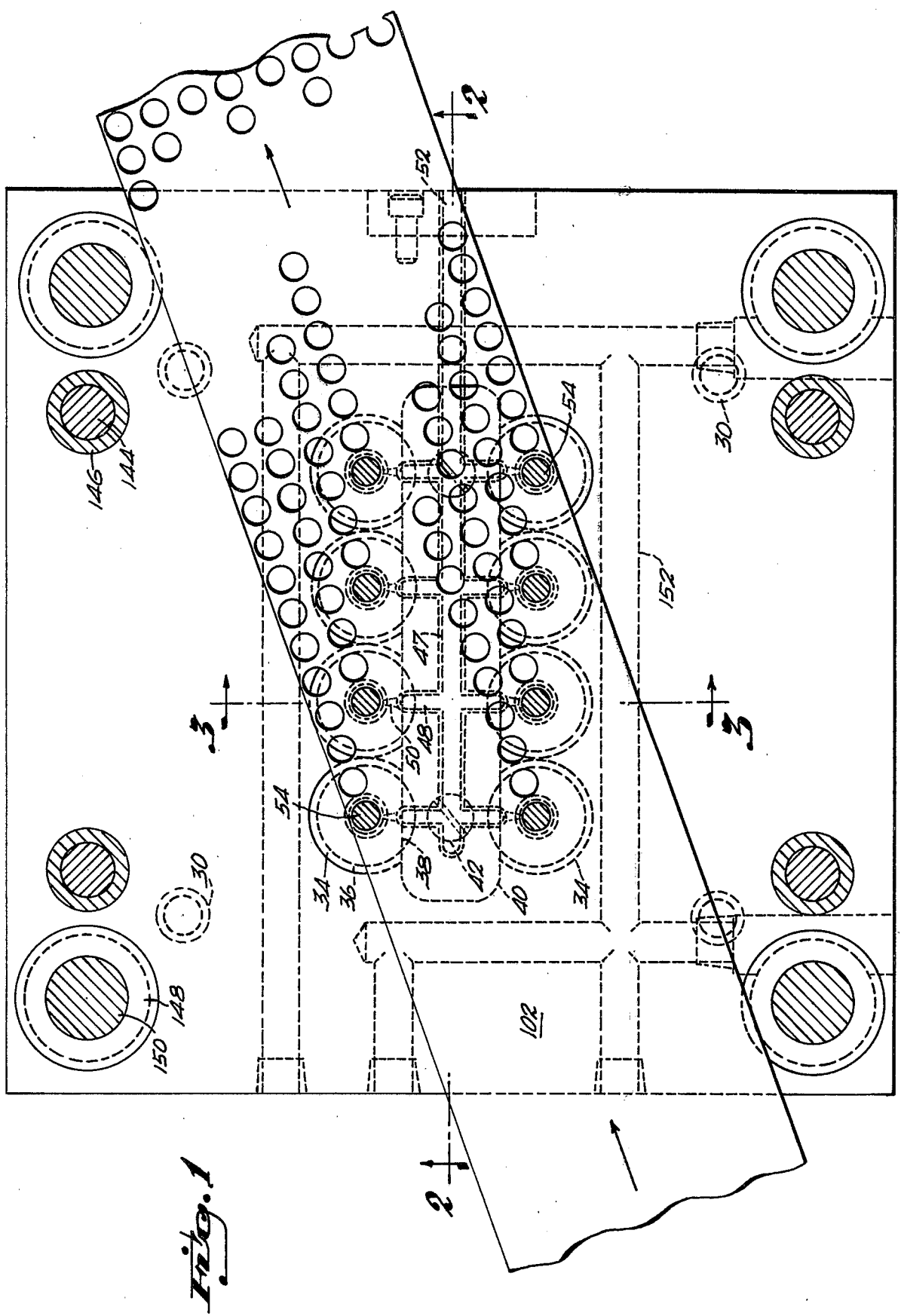
FIG. 1 is a top plan view of a lower portion of the plastics molding device of the present invention, as indicated by the arrows 1—1 on FIG. 2.

As best illustrated in FIG. 1, a main trunk runner groove 47 is defined in the bottom face of plate 18 in a generally central parallel relation to molding members 34. Branch runner grooves 48 connect between main groove 47 and gates 50 opening into each mold cavity 44. The main trunk runner groove 46 opens outwardly of one side of plate 18, as at 52, for connection to a source of supply of molten plastic in any conventional manner.

A punch die 54 is provided in an axially aligned relation to each cavity 44, and normally extends upwardly through a bushing 56 secured in plate 16 and includes an enlaarged head 58 seated on an annular shoulder 60 defined about the top of a bore 62 for passage of punch die 54. Head 58 is secured against shoulder 60 by a set screw 62.

A core pin 64 for each cavity 44 is slidably engaged through aligned apertures 66, 68 in plates 20 and 22 and includes an enlarged head 70 for vertical movement within an enlarged aperture portion 72 defined upwardly through the bottom of plate 22. Portion 72 is of a predetermined depth to permit a limited movement of core pin in an axially aligned relation to cavity 44, whereby a slightly inwardly tapered upper tip end portion 74 of core pin 64 penetrates cavity 44 to a predetermined distance short of the top end 76 of cavity 44 in the closed positions of mold portions 10 and 12 as seen in FIG. 3. Each core pin 64 is resiliently urged upwardly by a compression spring 78 disposed in an upwardly opening hole 80 in plate 24.

FIG. 3 illustrates the plastic material P in the trunk and branch runners 46, 48, gates 50, and the cavities 44 to form the flash caps 100. With reference to FIGS. 1, 2 and 3, a sheet or wide strip of a suitable absorbant material such as "Tyvek, " produced by the DuPont Corp., and which is indicated by the numeral 102, is disposed between plates 16 and 18. The strip 102 is disposed on a predetermined angle relative to the eight punch dies 54 and cavities 44 to utilize a maximum amount of the "Tyvek" material as the device is operated to punch out individual "Tyvek" discs 104 and to position them in a closing relation to the top end of the respective flash caps 100. The "Tyvek" strip is indexed after each molding operation in a conventional manner, in unison with the opening of the jaws of the press and forming no part of the present invention.

After each molding operation, the press jaws (not shown) are opened and the top portion 10 and bottom portion 12, fixed to the respective jaws, as above described, are separated along the parting line 110, FIGS. 2 and 3, and are moved a predetermined distance apart. The three plates 14, 16 and 18, thereupon, are automatically separated in the following manner. The plates 16 and 18 are separated a predetermined distance 112, FIG. 4, by a pair of compression springs 114 and limit bolts 116, FIGS. 2 and 4. The bolts, FIG. 4, are secured in plate 18, and the enlarged heads 118 are free to travel in a hole 120 in plate 14, and bottom against the top surface of plate 16 to limit the relative movement of plates 16 and 28 to define the space 112 to permit the indexing of the "Tyvek" strip. Simultaneously, pairs of compression springs 122 and limit bolts 124, one each illustrated in FIGS. 3 and 4, operate in the same manner to separate plates 14 and 16 as at 126.

At the same time, the bottom portion 12 moves donwwardly and the plate 20 is separated from plate 22 in the following manner. A knock-out rod 130, FIGS. 2 and 4, includes a threaded upper end 132 secured in plate 20, and, as the lower press jaw descends, the lower end 134 of the knock-out rod, FIG. 2, strikes a fixed abutment 136, arresting the movement of the plate 20 while plates 22, 24 26 continue their descent to the bottom of the stroke of the lower press jaw (not shown). The knock-out rod 130 is spring-loaded at 138 to return the plate 20 against plate 22 when the lower press jaw begins ascent.

A plurality of sucker pins 140, FIGS. 2, 3 and 4 are secured relative to plate 22 and include downwardly inwardly tapered upper tip ends 142. The main top portion 10, FIGS. 1 and 2, include a plurality of alignment pins and bushing 144, 146, and a like plurality of bushings 148 are secured in plate 18 of the top portion 10 for sliding engagement by respective pins 150 secured relative to the main bottom portion 12 to maintain a perfect alignment of portions 10 and 12 when in operation. A network of coolant holes such as 152, 154 are provided in plates 18 and 20 adjacent to the molding members 34.

Travel limit bolt means 160, FIGS. 3 and 4, are provided for the plate 20, and a bolt and sleeve attachment means 162, 164 are provided to removably secure the three bottom plates 22, 24 and 26.

OPERATION OF THE MOLDING DEVICE:

In operation, the upper and lower main molding assemblies 10 and 12 are closed as in FIGS. 2 and 3 and the plastic material P, in a molten state, has been injected into the plurality of cavities 44 through the main trunk and branch inner grooves and gates 46, 48 and 50. At this time, the slightly tapered tip end portions 74 of core pins 64, are positioned within the cavities to define the side walls of the flash caps 100.

Figure 5:
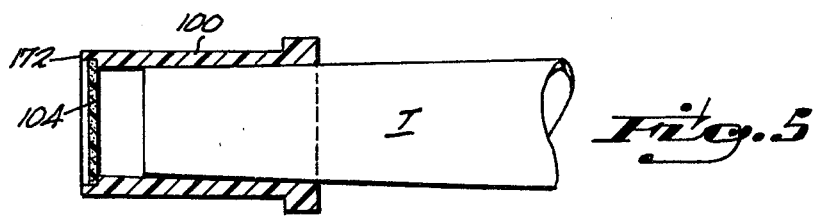
FIG. 5 is an elarged fragmentary view of a catheter with a flash cap, in accordance with the molding device of the present invention, positioned on the normally open rear end thereof.

While the assemblies 10 and 12 are being closed, the upper three plates 14, 16 and 18 also move to closed positions, causing the punch dies 54 to pierce the "Tyvek" strip 102 to form an individual "Tycek" disc 104 for each cavity 44. The discs 104 are punched and driven downwardly through the bores 170 an positioned against the tip ends of the core pins 64 in the top ends of the respective cavities 44. When the molten plastic material is injected into the cavities 44, the "Tyvek" discs 104 are integrally bonded, in a closing relaiton, within the top ends 172 of the flash caps 100 as best illustrated in FIG. 5.

When the mold portions 10 and 12 are opened to the positions illustrated in FIG. 4, the flash caps 100 are withdrawn from the cavities 44. To accomplish the withdrawal, one or more small ridges 172, FIGS. 3 and 4, are defined on the side walls of the very tip ends of each core pin. It should also be noted that a concavity 174, FIG. 3, is defined in the tip end face of each core pin 64 to prevent the compression of the main central area of the "Tyvek" discs 104.

Simultaneously with the withdrawal of the flash caps 100, the plastic runners P, by reason of engagement of the tip ends 142 of the plurality of sucker pins 140 therein, are broken free of the flash caps 100 and are pulled from the runner grooves 46, 48, FIG. 4. At this point, the bottom end 134 of the knock-out rod 130 will contact the abutment 136, FIG. 2, arresting the downward movement of plate 20 while permitting a continued movement of plates 22, 24 and 26 whereby the core pins 64 and sucker pins 140 are withdrawn respectively from the flash caps 100 and runners P as clearly illustrated in FIG. 4. The completed flash caps 100 and runners P are individually free for removal from the top face of plate 20 in any conventional manner. FIG. 5 illustrates a flash cap 100 engaged on the normally open end of a tube T of a catheter.

While a preferred form of the invention has been herein disclosed, it will be evident to those skilled in the art that various changes and modifications can be made therein without departing from the true spirit of the invention as defined in the appended claims.

What is claimed is:

1. A device fo molding flash caps for catheters, for fixed attachment relative to confronting upper and lower faces of respective upper and lower operable jaws of a conventional press, and including conventional indexing means for a strip of a suitable absorbant material to index the strip for a predetermined distance with each operation of the jaws between open and closed positions, said molding device including a top molding portion for fixed attachment to the upper face and a bottom molding portion for fixed attachment to the lower face, in a spaced apart relation to said top portion, in the jaws open position, at least one cavity of a predetermined size and configuration, opening upwardly through a bottom wall of said top portion, a core pin mounted in said bottom portion in axial alignment with said cavity, and normally disposed below said cavity in a retracted position, when the jaws are in the open position, and a punch die mounted in said top portion in axial alignment with said cavity and core pin, and disposed above the strip of material, in a retracted position, in a jaws open position, whereby, operation of the jaws to closed positions moves said top and bottom portions into an abutting relation and extends a tip end portion of said core pin to a predetermined depth inwardly of said cavity, and simultaneously advances said punch die axially inwardly, in an opposed relation to said core pin, to punch a disc shaped portion from the strip and to advance the disc portion inwardly of a top end of said cavity to a position against a tip end face of said core pin, whereby, a peripheral edge portion of the disc is integrally bonded in a top end of a flash cap as formed in said cavity, when a suitable molten plastic material is injected into a peripheral portion of said cavity, surrounding said core pin leading end portion through appropriate runner and gate means, and into engagement with said peripheral disc edge portion.

2. The device as defined in claim 1 including a plurality of like cavities opening upwardly through said bottom wall, with one each of said core pins and punch dies associated with each of said cavities and operable, to form a flash cap in each of said cavities when the jaws are operated to the closed position and the molten plastic material is injected into a surrounding portion of each cavity through said runner and gate means.

3. The device as defined in claim 2 wherein said plurality is comprised of two spaced apart rows of cavities.

4. The device as defined in claim 3 wherein each row includes four cavities.

5. The device as defined in claim 3 wherein said upper portion is comprised of an assembly of parallel plates, comprised of lower, intermediate, and upper parallel plates, with the strip of material being disposed between said lower and intermediate plates.

6. The device as defined in claim 5 including means to separate said lower and intermediate plates a predetermined distance, when the jaws are operated to the open positions, defining a predetermined spacing therebetween, to permit the indexing of the strip of material.

7. The device as defined in claim 6 wherein said means to separate said lower and intermediate plates comprises a plurality of bolts, threaded into a top portion of said lower plate in a spaced relation, each bolt being loosely engaged through hole means in said intermediate plate and including an enlarged head portion normally positioned a predetermined distance above a top surface of said intermediate plate, and including compression spring means engaged between said lower and intermediate plates, whereby said lower and intermediate plates are moved from a clamping engagement against the strip when the jaws are in the open position, permitting said indexing.

8. The device as defined in claim 7 including means to separate said intermediate and upper plates of said top portion a predetermined distance, when the jaws are operated to the open positions.

9. The device as defined in claim 8 wherein said means to separate said intermediate and upper plates comprises a plurality of bolts, threaded into a top portion of said intermediate plate, in a spaced relation, each bolt being loosely engaged through hole means in said upper plate, and including an enlarged head portion normally positioned a predetermined distance above a shoulder defined in said upper plate above said upper plate hole means, and including compression spring means engaged between said intermediate and upper plates.

10. The device as defined in claim 5 wherein each of said punch dies includes an upper end, rigidly fixed in said upper portion top plate.

11. The device as defined in claim 8 including means to define a predetermined separation between a top plate of said bottom portion and a lower end base portion thereof, with said jaws in the open positions.

12. The device as defined in claim 11 wherein said means to define, comprises, a knock-out rod including an upper end portion secured to said bottom portion top plate, a shank portion extending freely through hole means in said lower end base portion to a bottom end portion, extending downwardly beyond said lower end base portion for contact with a fixed abutment, prior to the movement of the jaws to completely open positions.

13. The device as defined in claim 12 wherein said knock-out rod is spring-loaded to a normally down position.

14. The device as defined in claim 5 wherein said runner and gate means comprises a main trunk runner groove defined in a bottom face of said upper portion lower plate, positioned between said rows, and a branch runner groove connecting between said trunk groove and a gate, opening into each of said cavities.

15. The device as defined in claim 2 wherein each of said core pin tip end portions is somewhat tapered to said tip end face.

16. The device as defined in claim 15 including at least one longitudinal ridge defined along at least a portion of said tapered tip end portion to remove the flash caps from said cavities when the jaws are operated to the open positions.

17. The device as defined in claim 2 including a concavity defined in each of said tip end faces.

18. The device as defined in claim 1 including at least one sucker pin mounted in said bottom molding portion in alignment with said runner means and including a reversely tapered tip end portion for engagement in a plastic runner formed in said runner means, with the jaws in the closed positions, to withdraw said plastic runner from said runner means when the jaws are operated to the open positions.

19. The device as defined in claim 18 including a plurality of sucker pins mounted in said bottom molding portion.

20. The device as defined in claim 2, including a network of coolant holes defined in each of said upper and lower molding portions, adjacent said cavities to provide for a flow of a suitable coolant therethrough, such as water.

21. The device as defined in claim 1 including bushing means secured in said upper portion for sliding engagement by pin means, fixed in said lower portion.

22. The device as defined in claim 5 including aligned bushing and pin means secured in said assembly of parallel plates in a manner so as to permit aligned relative movement of said assembly of plates.

23. The device as defined in claim 1 is spring-loaded toward an extended position.

24. The device as defined in claim 11 wherein said lower end base portion is comprised of three plates including bolt means to secure said three plates in a fixed relation.

25. The device as defined in claim 10 including a bushing secured in said intermediate plate for sliding engagement by each of said punch dies.

26. The device as defined in claim 1 wherein the strip of absorbant material is of a non-woven synthetic fabric such as that produced by the DuPont Corp. under the trade name "Tyvek".

* * * * *